No. 707,092. Patented Aug. 19, 1902.
C. H. FALK.
DRAFT ATTACHMENT.
(Application filed Mar. 11, 1902.)

(No Model.)

WITNESSES
Edwin P. Rea
W. B. Catchings

INVENTOR
Charles H. Falk.
by Herbert W. T. Jenner.
Attorney

THE NORRIS PETERS CO., PHOTO-LITHO., WASHINGTON, D. C.

UNITED STATES PATENT OFFICE.

CHARLES H. FALK, OF KINSLEY, KANSAS.

DRAFT ATTACHMENT.

SPECIFICATION forming part of Letters Patent No. 707,092, dated August 19, 1902.

Application filed March 11, 1902. Serial No. 97,726. (No model.)

*To all whom it may concern:*

Be it known that I, CHARLES H. FALK, a citizen of the United States, residing at Kinsley, in the county of Edwards and State of Kansas, have invented certain new and useful Improvements in Draft Attachments; and I do hereby declare the following to be a full, clear, and exact description of the invention, such as will enable others skilled in the art to which it appertains to make and use the same.

This invention relates to draft attachments for headers, harvesters, and other similar agricultural instruments; and it consists in the novel construction and combination of the parts hereinafter fully described and claimed.

Figure 1:
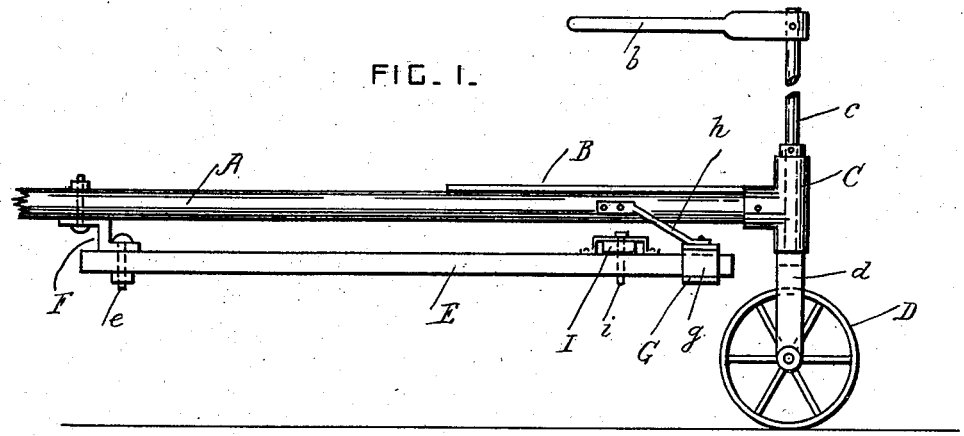
Figure 2:
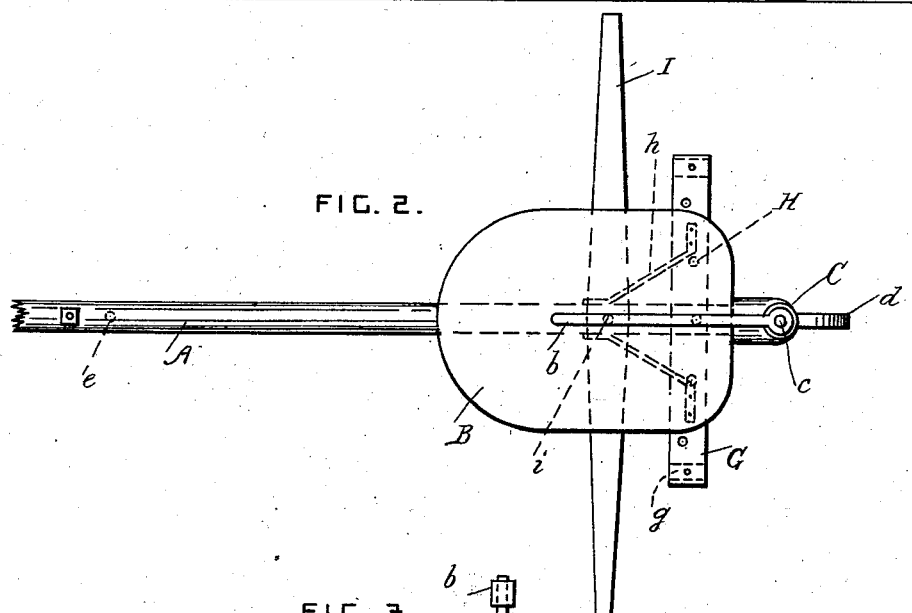
Figure 3:
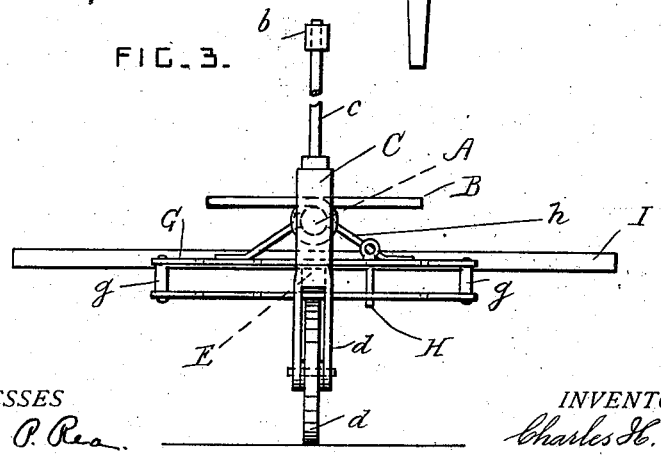

In the drawings, Figure 1 is a side view of the draft attachment. Fig. 2 is a plan view of the draft attachment. Fig. 3 is a front view of the same.

A is the main draft-pole of a header or other similar agricultural implement. B is the steering-platform, supported by the front end portion of the pole A. C is the steering-bracket, secured to the front end portion of the pole A. D is the steering-wheel, which is journaled in a frame $d$, provided with a spindle $c$. The spindle $c$ is journaled in the steering-bracket C, and $b$ is the steering-handle, which is secured to the upper end portion of the spindle $c$. All these parts are of any approved construction.

E is an auxiliary draft-pole provided with a pin $e$ at its rear end, which connects it pivotally with a bracket F, secured to the main pole A. The draft-pole E may, however, be connected to the pole A by any means which will permit its front end to move in a horizontal plane under the pole A.

G is a guide for the front end of the pole E, provided with stops $g$ at its ends for limiting the extent of the motion of the pole E. The guide G is secured to the front end of the main pole A by rods $h$ or any other approved fastening devices.

A locking device H is provided for connecting the front end portion of the pole E to the guide in a central or other position, as may occasionally be desired. Any approved form of locking device may be used and the guide G may be straight or curved, as is found more convenient in carrying out the invention.

I is a doubletree which is pivoted by a pin $i$ to the auxiliary draft-pole instead of being pivoted to the main pole, as in draft attachments of ordinary construction.

There are numerous advantages in constructing a draft attachment in this manner, one of the principal advantages being that the draft-animals do not pull against the action of the steering-wheel and the machine is much more easily steered.

What I claim is—

1. In a draft attachment, the combination, with a main pole, and steering mechanism carried by it; of an auxiliary draft-pole having its rear end pivotally connected to the said main pole, substantially as set forth.

2. In a draft attachment, the combination, with a main pole, and steering mechanism carried by it; of a guide secured to the front end portion of the said main pole, and an auxiliary draft-pole having its rear end pivotally connected to the said main pole and its front end portion slidable in the said guide, substantially as set forth.

3. In a draft attachment, the combination, with a main pole, and steering mechanism carried by it; of a guide secured to the front end portion of the said main pole, an auxiliary draft-pole having its rear end pivotally connected to the said main pole and its front end portion slidable in the said guide, and a locking device for securing the said auxiliary draft-pole in the said guide in different positions, substantially as set forth.

4. In a draft attachment, the combination, with a main pole, and steering mechanism carried by it; of an auxiliary draft-pole having its rear end pivotally connected to the said main pole and arranged underneath it, and a doubletree pivoted to the front end portion of the said auxiliary draft-pole and arranged between it and the main pole, substantially as set forth.

In testimony whereof I affix my signature in presence of two witnesses.

CHARLES H. FALK.

Witnesses:
H. D. JONES,
J. P. WOODS.